United States Patent [19]
Bachle

[11] Patent Number: 4,793,434
[45] Date of Patent: Dec. 27, 1988

[54] ROAD FINISHING MACHINE

[75] Inventor: Hans-Dieter Bachle, Aerzen, Fed. Rep. of Germany

[73] Assignee: ABG-Werke GmbH, Hameln, Fed. Rep. of Germany

[21] Appl. No.: 30,152

[22] Filed: Mar. 24, 1987

[30] Foreign Application Priority Data

Apr. 4, 1986 [DE] Fed. Rep. of Germany ....... 3611268

[51] Int. Cl.$^4$ ............................................. B60K 25/04
[52] U.S. Cl. ..................................... 180/243; 60/426; 180/305
[58] Field of Search ............... 180/242, 305, 308, 243, 180/306, 307; 60/420, 426

[56] References Cited

U.S. PATENT DOCUMENTS

| 3,641,765 | 2/1972 | Hancock et al. | 180/242 X |
| 3,916,625 | 11/1975 | Holtkamp | 180/242 X |
| 4,369,855 | 1/1983 | Buschbom et al. | 180/242 X |
| 4,528,871 | 7/1985 | Nembach | 180/242 X |
| 4,546,844 | 10/1985 | Stauffer | 180/308 X |

FOREIGN PATENT DOCUMENTS 20522 2/1983 Japan ...................................... 180/242

Primary Examiner—John J. Love
Assistant Examiner—Michael Mar
Attorney, Agent, or Firm—Frishauf, Holtz, Goodman & Woodward

[57] ABSTRACT

A road finishing machine comprising a diesel-hydraulically driven set of main wheels and at least one set of steerable wheels. An additional hydraulic companent is provided which transfers a driving force to the steerable wheels, and the peripheral speed of the steerable wheels is automatically adapted to that of the main wheels.

3 Claims, 1 Drawing Sheet

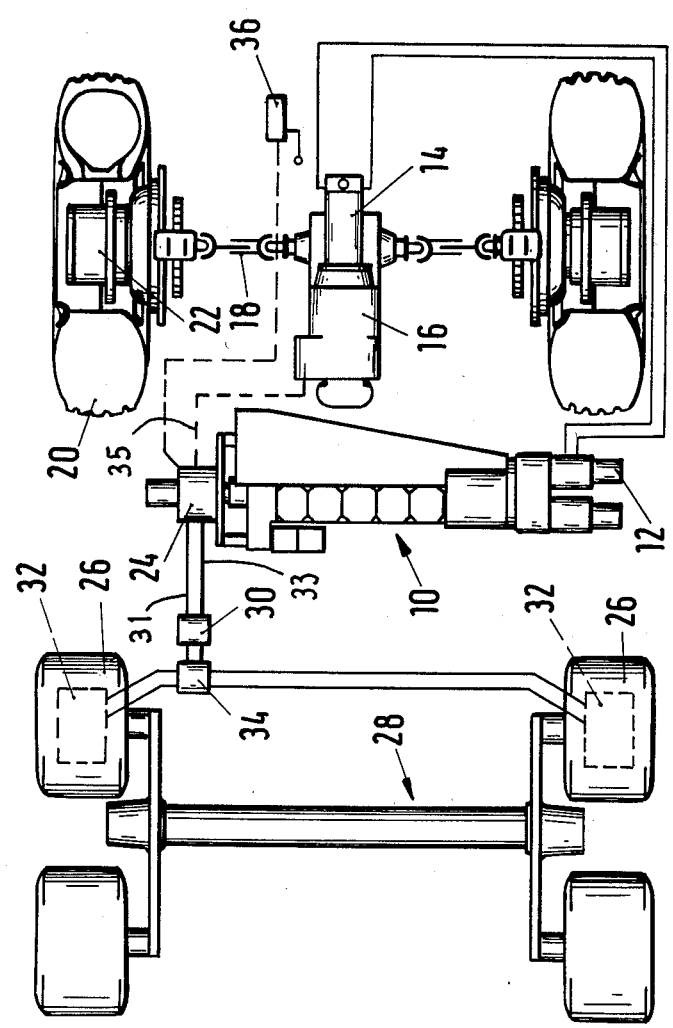

ROAD FINISHING MACHINE

BACKGROUND OF THE INVENTION

The present invention relates to a road finishing machine with diesel-hydraulically driven main wheels and at least one set of steerable wheels and, more particularly, to an apparatus for powering the driven wheels of such a vehicle.

A known road finishing machine has the driver's seat approximately above the powered main wheel set. Two pairs of steerable wheels are located in the direction of travel in front of the powered main wheel set, above which there is a container for the materials to be applied. These materials can be bituminous products, bonded or free mineral mixtures. The material to be applied is moved from the container to the rear and spread on the road surface. Behind the powered main wheel set, the road finishing machine has a set of components consisting of a vibrating tamping plank for tamping down the applied material. The effective width of the plank can be widely varied by extending it sideways. In operation, the wheels roll on the road surface which has been prepared for applying the material. Under unfavorable conditions, the traction on the road surface may be insufficient and this causes the powered wheels to spin. Therefore, a road finishing machine of this type is unsuitable. Instead, track or caterpillar type finishing machines are then used. However, track-type machines are considerably more expensive than wheel-type machines.

SUMMARY OF THE INVENTION

It is an object of the invention to improve a road finishing machine of the wheel-type described above such that its traction approaches that of a track-type road finishing machine.

This and other objects of the invention are attained by a road finishing machine having driven main wheels. A source of hydraulic power is coupled to a hydraulically driven set of such main wheels. Hydraulic component means transfers a driving force from the power source to at least one set of steerable wheels. Means are provided for automatically adapting the peripheral speed of the steerable wheels to that of the main wheels.

BRIEF DESCRIPTION OF THE DRAWINGS

The drawing shows a schematic plan view of the essential parts of the road finishing machine of the invention.

DETAILED DESCRIPTION OF THE PREFERRED EMBODIMENT

A single diesel engine 10 supplies the hydraulic power for all the driven wheels and other driven components. The road finishing machine includes rear wheels 20 and front wheels 26. Engine 10 powers an axial piston pump 12 feeding an axial piston motor 14. Pump 12 is designed to output a substantially constant volume of oil to motor 14. Downstream of motor 14 is disposed a gear box 16 with a locking differential, from which planetary gears 22, built into the hubs of main driven rear wheels 20, are driven via synchronizing cardan shafts 18. The speed of wheels 20 is varied by selectively changing the setting of gear box 16 with a conventional shift lever (not shown).

In accordance with a principle aspect of the invention, a further pump 24 is powered by the engine 10 and supplies oil under pressure for driving a pair 26 of the steerable tandem front wheel set 28. Pump 24 is preferably an axial piston variable displacement pump. As is conventional, its piston stroke is selectively variable and determines the volume of circulating oil which, in turn, affects rotational speed of a hydraulic motor driven thereby. Supply and return lines 31 and 33, respectively, run through a conventional free-wheel valve 30. When valve 30 is in the open position, it short-circuits the hydraulic path to wheels 26 so that the drive to the wheels 26 is turned off. Feeding of the wheel hub motors 32, which are preferably radial piston motors, takes place via a conventional flow divider 34. Differing amounts of oil under pressure are supplied in a conventional manner to motors 32 depending on the steering lock of the two motors. The total oil volume supplied to flow divider 34 is determined by the output of pump 24. The piston stroke of pump 24, and therefore its output volume, is controlled by the setting of gear box 16, as represented by link 35. In this manner, the output volume of pump 24 to flow divider 34 is set depending on the rpm of the main driven wheels 20 such that the wheels 26 automatically turn at the same peripheral speed, aside from the differences caused by steering lock, as the main driven wheels 20. The torque transferred to the wheels 26 can be selected infinitely variable by means of an adjustment device 36. Device 36 can be a conventional pressure choke such as a variable flow restrictor. Since the road construction material is carried in a container (not shown) atop wheels 26, it is advantageous to vary the torque to wheels 26 depending on the actual load in the container.

As can readily be seen from the above description, the present invention provides a road finishing machine of the wheel type wherein both the front and rear wheels are power driven. This is in contrast to the previous approach which powers only the rear wheels. By adopting the approach of the present invention, it is possible for the performance of a wheel-type machine to approach that of a track type.

Although a preferred embodiment of the invention has been described in detail above, various modifications thereof will readily occur to anyone with ordinary skill in the art. For example, instead of two wheels 20 four such wheels can be provided. Also all four wheels of the tandem set 28 can also be powered. All such modifications are meant to be included within the scope of the invention as defined by the following claims.

I claim:

1. A road finishing machine comprising:
   a set of rear wheels;
   at least one set of steerable front wheels;
   a first hydraulic motor means for driving said set of rear wheels;
   a second hydraulic motor means for driving said at least one set of steerable front wheels;
   an internal combustion engine;
   hydraulic first and second pump means driven by said engine for feeding pressurized hydraulic fluid to said first and second hydraulic motor means so as to drive said first wheels with substantially identical peripheral speed;
   a first hydraulic circuit connecting said first hydraulic motor means to said hydraulic pump means;
   a gearbox disposed between said first hydraulic motor means and said rear wheels;

means for linking said gearbox with said second hydraulic pump means for varying the output volume of said second hydraulic pump means as a function of the speed of said rear wheels;

a second hydraulic circuit, separate and distinct from said first hydraulic circuit, connecting said second hydraulic pump means to said second hydraulic motor means; and a short-circuit valve means interposed in said second hydraulic circuit for, when actuated, diverting the pressurized hydraulic fluid away from said second hydraulic motor means so as to reduce driving force on the driven front wheels to zero.

2. A road finishing machine in accordance with claim 1 further comprising means for adjusting driving force transferred to the first and second steerable wheels.

3. A road finishing machine in accordance with claim 1 wherein said internal combustion engine comprises a diesel engine.

* * * * *